United States Patent [19]
Akatsuka

[11] Patent Number: 6,022,580
[45] Date of Patent: *Feb. 8, 2000

[54] NATTO FOOD

[75] Inventor: Shinichiro Akatsuka, Saitama-ken, Japan

[73] Assignee: Keishi Nagashima, Ibaraki-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/965,568

[22] Filed: Nov. 6, 1997

[30] Foreign Application Priority Data

Nov. 7, 1996 [JP] Japan ................................. 8-295090

[51] Int. Cl.⁷ ................................ A23L 1/20; A23G 1/02

[52] U.S. Cl. ............................ 426/634; 426/44; 426/512; 426/454

[58] Field of Search ..................... 426/634, 512, 426/454, 44

[56] References Cited

FOREIGN PATENT DOCUMENTS

| | | |
|---|---|---|
| 49-21783 | 6/1974 | Japan . |
| 50-70545 | 6/1975 | Japan . |
| 54-34820 | 10/1979 | Japan . |
| 55-19037 | 2/1980 | Japan . |
| 57-9344 | 2/1982 | Japan . |
| 63-48509 | 9/1988 | Japan . |
| 3-143372 | 6/1991 | Japan . |

*Primary Examiner*—Anthony J. Weier
*Attorney, Agent, or Firm*—Weingarten, Schurgin, Gagnebin & Hayes LLP

[57] ABSTRACT

A new natto food is provided, which has a good color, does not scatter easily, is easily handball, has excellent dispersibility, gives gentle feeling when eating without sticking to the oral cavity, has rich taste since there is no peculiar smell, and has new flavor and deliciousness. Soybean flour and/or edible fiber are blended with natto powder. It is more preferable to employ a heat-treatment at least in one of processes comprising: blending the soybean flour and/or the edible fiber with the natto powder; pelletizing and shaping the mixture to granules, drying the shaped matter. The blending ratio of the soybean flour to 1 part by weight of the natto powder is preferably 0.15 to 0.3 parts by weight.

10 Claims, No Drawings

NATTO FOOD

BACKGROUND OF THE INVENTION

1. Field of the Invention

The present invention relates to a natto food, and more particularly to the natto food which is made more easily eatable by blending soybean flour and/or edible fiber to natto powder thereby masking a peculiar smell for easier eating.

2. Background Art

Conventionally, many methods of manufacturing powdered natto which is a fermented soybean product are proposed, such as a method of producing active dry natto by adding cellulase, protease and the like for fermentation in a process for inoculating Bacillus Natto to soybean as law material, fermenting the mixture, and drying it by the combination of wind velocity drying and freeze vacuum drying method (Japanese Patent Publication No Sho 49-21783), a method of producing powdered natto by cooling the natto below 5° C. in advance, crushing and powdering after vacuum freezing and drying (Japanese Patent Application Laid-Open No. Sho 50-70545) and others (Japanese Patent Publication Nos. Sho 57-9344 and 63-48509). Thus, these methods for drying and powdering the natto by utilizing the vacuum freeze and dry method are publicly known.

Also, a method of processing natto by separating the natto into an outer layer portion and an inner layer portion after vacuum freezing and drying the natto and then powdering it (Japanese Patent Publication No. Sho 54-34820) and a method of producing a health food by separating natto into the outer layer portion and the inner layer portion after vacuum freezing and drying the natto crushing the outer layer portion and adding and mixing lecithin to the crushed outer layer portion (Japanese Patent Application Laid-Open No. Sho 55-19037) are also proposed. In addition, a method of preparing granulated natto after adding an emulsifier into the natto powder has been already tried.

However, these try to obtain powdered dry natto which can be well preserved while maintaining the properties of raw natto, or these are the processing methods for effective utilization of each part of the natto or the methods for processing efficiently.

These conventional powdered dry natto has the following shortcomings:

(a) If the natto is used as dry powder, it is easily scattered and handling becomes more difficult. Moreover, the powdered natto has a poor dispersibility during use. Even though it is utilized by dissolving in water or hot water, granular solids are created and this is troublesome for work. When the granular solids created are eaten, they stick to the oral cavity and are sticky to the touch and this gives very rough feeling when eating.

(b) Normally, when the natto powder is processed as it is to the granules, stickiness occurs if moisture is added, thereby making the granulation difficult and moreover the granules obtained will strongly retain the peculiar smell of the natto.

(c) When various emulsifiers are added to the natto powder for granulation purpose, the problems stated above are slightly improved but the peculiar smell of natto still remains considerably, so that the range of its use is likely to be limited.

SUMMARY OF THE INVENTION

The general object of the present invention is to provide a natto food which has a good tone of color, excellent dispersibility during use, easy handling, almost no scattering, gives gentle feeling when eating without the peculiar smell of the natto and without sticking to the oral cavity, moreover, provides new deliciousness as well as a new flavor, thereby eliminating all the shortcomings stated above.

The inventor of the present invention has made every effort in research and development work for solving the conventional problems stated above and, as a result, the inventor discovered that a new natto food having no shortcomings described previously can be obtained by a new technique based on completely different philosophy from that of the conventional foods processed from the natto.

A first object of the present invention in claim 1 is to provide a natto food produced by adding and mixing soybean flour and/or edible fiber to the natto powder.

A further object of the present invention in claim 2 is to provide the natto food in claim 1, wherein the natto food is pelletized and shaped to the granules.

Another object of the present invention in claim 3 is to provide the natto food in claim 1 or claim 2, wherein the natto food is heat-treated with at least one of the processes comprising blending the natto powder with soybean flour and/or edible fiber, pelletizing and shaping the mixture, and drying the shaped mixture.

A further object of the present invention in claim 4 is to provide the natto food in claims 1 to 3, wherein 0.15 to 0.3 parts by weight of the soybean flour to 1 part by weight of the natto powder is blended.

DETAILED DESCRIPTION OF THE PREFERRED EMBODIMENTS

The natto used in the present invention is not specially restricted as long as it is produced by acting the Bacillus natto to soybeans. For instance, soybeans are immersed in water and then heated with steam. The steamed soybeans are put in a new straw bundle in a cellar and fermented at 40° C. Then it is cooled off as natto in a straw bundle. Or purely incubated Bacillus natto is sprinkled over the steamed soybeans for fermentation and then the resulted fermented soybeans is cooled as natto. The soybeans can be round soybeans or cracked (or cut) soybeans available on the market.

The natto generally has a threading property and a peculiar smell but also has a digestive power and enzymatic activities (having such as protease for decomposing protein into amino acid, amylase for turning starch into glucose, cellulase for turning fiber into sugar, lipase for decomposing fat into glycerin and fatty acid, saccharase for turning sucrose into glucose, etc.). In addition, the natto also has nutritive values such as vitamins and the effect of medicine such as immunological enhancing action, and is a food widely being utilized in Japan as one kind of fermented soybean food and also health food.

The soybean flour used in the present invention is an ordinary soybean flour obtained by parching and crushing soybeans. The preparative method thereof are that the whole soybeans may be crushed together after parching, or roughly crushed with the skin removed and then final grinding. Even the soybean flour available on the market may be used in the present invention. The flavor and digestibility of the soybean flour may be improved by heating and crushing and thus the soybean flour is an excellent food from the viewpoint of nutritive values. The soybean flour becomes porous after powdering and has the characteristics of taking the essential low molecular fragrance component possessed by protein into the porous tissue.

The edible fiber used in the present invention is a slow-digestible or undigestible edible fiber component and examples thereof includes soluble sugars, insoluble sugars not digested by amylase and organic fiber (dietary fiber, low-calorie food material, fatty-substituting food material, white odorless food material) of undigestible matters of foods derived from animals, such as chitin, chitosan or the like.

Examples of edible fibers preferably used for the present invention includes soybean oligosaccharide, sunfiber, slow digestible dextrin, and branched chain dextrin, and more particularly water-soluble vegetable fiber (named "sunfiber") obtained by treating guar gum with an enzyme, fiber (dextrin containing edible fiber) obtained by dissolving toasted dextrin, which was obtained by adding a small amount of acid to refined starch, in water, heating it, pH-adjusting it with sodium hydroxide, hydrolyzing it by adding α-amylase, refining it by decoloring, filtration and ion exchange resin, condensing it and spray-drying it, and fiber (dextrin containing vegetable fiber) obtained by adding gluco-amylase to said afore-mentioned condensed substance, decomposing digestible portions thereof into glucose, removing the glucose from the residue, refining it in the same manner, condensing it and spray-drying it.

The natto food according to the present invention can be obtained by uniformly blending soybean flour and/or edible fiber with the natto powder obtained by drying and crushing by the known vacuum freezing and drying method, pressure-reduced drying method or heated pressure-reduced drying method. Any equipment used for blending, any blending method and any blending proportion can be selected for the purpose of the present invention and thus any publicly known equipment and methods for uniformly blending the natto powder with them can be utilized.

Also the natto food according to the present invention can be used as the final product as it is after blending the soybean flour and/or edible fiber to the natto powder. However, pelletizing and shaping is preferable after blending soybean flour and/or edible fiber with the natto powder. Form and size of particles after pelletizing and shaping, and pelletizing/shaping machine and method used in the present invention are not specially limited. The form of pelletized and shaped particles may be actually similar to granules or flakes shaped using a pelletizing machine or tablets shaped using a tabletting machine.

In order to obtain particles of the natto food according to the present invention having a good, constant form when blending soybean flour and/or edible fiber with the natto powder, it is preferable to pelletize and shape the particles thereof after adjusting the amount of water in the powder mixture by uniformly adding a small amount of moisture.

Amount of moisture to be added is affected by various factors, such as the amounts of moisture originally contained in the natto powder, the soybean flour and the edible fiber as raw materials, used pelletizing method, used amount of air flow and temperature during pelletizing, employed pelletizing time, employed drying temperature and time. Thus the amount of moisture to be added is varied and is not restricted.

In the present invention, it is further preferable to add a binder to said moisture to be added when using soybean flour. Examples of the binder includes corn starch, potato starch and the like. When these binders are used, they are preferably dissolved in water to produce an aqueous solution thereof and preferably is heated when using. The concentration of the binder in the aqueous solution is not specially restricted, but the preferable range of about 1 to 3 wt % is effective.

In the present invention, only the soybean flour may be blended with the natto powder. Or only the edible fiber, or both the soybean flour and the edible fiber may be blended with the natto powder. The blending ratio between the natto powder and the soybean flour can be arbitrarily selected from a wide range such as about 1 to 99: 99 to 1 in weight ratio for the natto powder: the soybean flour. If the blending proportion of the natto powder is increased, then the resulted natto food having a strong flavor of natto or the natto food creating more desired deliciousness of natto may be obtained. On the contrary if the blending proportion of the soybean flour increases, the resulted natto food having a strong flavor of the soybean flour and completely removed the peculiar smell of natto can be obtained.

The blending ratio between the natto powder and the edible fiber can be arbitrarily selected from a wide range such as about 1 to 99: 99 to 1 in weight ratio for the natto powder: the edible fiber. If the blending proportion of the natto powder is increased, then the resulted natto food having a strong flavor of natto or the natto food creating more desired deliciousness of natto may be obtained. On the contrary if the blending proportion of the edible fiber increases, a slightly sweet food characterized by the edible fiber can be obtained.

For instance, if the natto food according to the present invention is to be produced as granules having natto flavor without the peculiar smell of natto, it is preferable to have a range of 0.15 to 0.3 parts by weight of the soybean flour to 1.0 part by weight of the natto powder If the natto powder and the soybean flour are blended uniformly in the blending range as stated above, then the natto food of the present invention can easily provide the characters stated above by adjusting the amount of moisture of the powder mixture by adding a small amount of water and pelletizing and shaping. If the amount of the used soybean flour is less than 0.15 parts by weight, then the peculiar smell of natto remains, and any granular natto food cannot be obtained efficiently because granules and granular solids thereof are existed at the same time. If the amount of the used soybean flour is exceeded over 0.3 parts by weight, the flavor of the soybean flour becomes stronger and the target flavor of natto food can be degraded.

An example of the production of the granular natto food according to the present invention having an extremely small amount of the peculiar smell of natto while leaving a slight natto flavor will be described below.

20 g of soybean flour is added to 90 g of natto powder. 200 cc of heated 2.5% corn starch (edible fiber) aqueous solution is added as a binder aqueous solution. They are uniformly mixed and granulated by using a pelletizing machine. The obtained granules are dried for 40 minutes by hot air at about 50 to 65° C. and thereby the granular natto food of the present invention having no peculiar smell of natto can be obtained. However if the amount of the soybean flour added is less than 10 g, then the peculiar smell of natto still remains; if it exceeds 30 g, then the smell of the soybean flour appears.

The powdered mixture blended the soybean flour and/or the edible fiber with the natto powder as it is can become excellent natto food according to the present invention with less peculiar smell of natto, a good color and less stickiness to the touch when eating even though they are not subjected to a special heat treatment because it is considered the peculiar smell originally possessed by the natto powder is absorbed by the soybean flour and/or edible fiber.

However, in view of food sanitation, it is preferable to employ a heat-treatment for about 30 minutes at around 50 to 65° C., and more preferable to be for 30 minutes at 63° C. at least in one of the processes comprising blending the natto powder with the soybean flour and/or the edible fiber, pelletizing and shaping the mixture, and drying the pelletized and shaped product. By employing this kind of heat-treatment, the natto food according to the present invention can be obtained which has a good color, has less peculiar smell and has no stickiness to the touch when eating while providing other new features such as a new flavor and deliciousness.

By the heat-treatment stated above, it is considered that various germs can be sterilized, a new flavor and deliciousness can be produced by a partial occurrence of condensation and polymerization of amino acid by the enzymatic reaction of protein possessed by the Natto, and sugars and amino acids contained causes the Maillard reaction producing flavors, and these flavors further masks the peculiar smell of Natto.

In the present invention, other food materials can be added to the powder mixture of the Natto powder blended with the soybean flour and/or the edible fiber. Examples of the other food materials includes tea, fruits such as apples, oranges or the like, tomato, Japanese apricot, sea weed, beefsteak plant, cheese, coffee, cocoa powder, various powders or liquids of other dairy products and fancy foods. They are in a state of solutions or in a state of solids when being added, or they can be used by dissolving them in said binder aqueous solution. When such the other food materials are employed, the Natto foods having some individual flavors or the natto foods having said flavors mixed together can be obtained.

Instead of the soybean flour, edible fiber comprising polysaccharide such as starch can be mixed with natto powder and certain satisfactory results are sometimes obtained depending on the purpose of the use. However the effect of masking the peculiar smell of natto and the flavor thereof may be lower compared to that of the soybean flour. Thus, in the present invention, part of the soybean flour may preferably be replaced with the edible fiber stated above, or said edible fiber may preferably be used instead of the soybean flour depending on the purpose of use.

In the present invention, if a seasoning such as glycine is added to the powder mixture of the Natto powder, the soybean flour and/or the edible fiber, the deliciousness thereof can be further enhanced. In addition, if adequate amounts of salt and/or a sweetener are added thereto, the resulted natto food freely utilizing the deliciousness of the natto itself can be obtained.

Also, in a process for blending the natto powder with the soybean flour and/or the edible fiber or processing the mixture if spices such as an extract of herbs or cinnamon are added thereto, the natto food directly utilizing the flavor thereof can be obtained. Also by adding sweeteners such as sugar, maple syrup, muscovado or watermelon sugar in a process for blending the natto powder with the soybean flour and/or the edible fiber or processing the mixture, the natto food which can completely change the conventional concept of the natto can be obtained.

Any package for the natto food according to the present invention is used and not specially restricted. Actually, for example, the natto foods can be placed on or packed in a film, sheet, bag or box of a material having a barrier property such as a glass, a metal, a synthetic resin, a wood, other natural materials and their combinations. For long-term storage, it is preferable to pack it with a deoxidation agent and/or a desiccating agent.

The natto food according to the present invention not only give less peculiar smell of natto but also give a new flavor and deliciousness. The soybean flour which can be used in the present invention contains a large amount of sugars in addition to modified protein already heated and is mixed together with the natto powder containing a large amount of amino acids and various enzymes, and thereby the peculiar smell of natto is absorbed by the soybean flour and disappears. Also if it is heat-treated in the pelletizing and shaping process, it is considered that condensation and polymerization of amino acids are partially performed by the adding new deliciousness to the natto food according to the present invention.

Typical enzymes contained in natto are protease, peptidase as protein decomposing enzymes and amylase as a starch decomposing enzyme. These enzymes have specially strong activity among a group of many enzymes contained, and neutral protease decomposes protein having large molecules and produces amino acid and peptide.

It is considered that since the components of said amino acids and peptides both formed by decomposing and digesting nutrient (proteins, sugars, etc.) in the fermentation process of the Bacillus Natto, vitamin such as Natto kinase originally produced by the Bacillus natto, heated protein derived from used soybean flour as the same raw material as natto, sugars, and a small amount of starch are uniformly blended, more amino acids and also monosaccharides are produced.

Also, sugars and amino acids are reacted by the Maillard reaction during said heating treatment to produce some other fragrances and these fragrances are considered to be absorbed by the soybean flour or directly mask the peculiar smell of the natto with a flavor characteristic of the soybean flour.

Though the natto food according to the present invention can be prepared without employing a heat-treatment stated above to the powder mixture of the natto powder, the soybean flour and/or the edible fiber, to employ a heat-treatment during the pelletizing and shaping process or the drying process is more preferable because of the reason as stated above.

In general, edible fiber is desired to be eaten by 20 to 25 g per day per adult as a target amount recommended by the Ministry of Health and Welfare in view of restricting the onset of cancer and of lowering the amount of cholesterol in blood. The natto powder according to the present invention contains about 2.7 g of rough fiber in 40 g of natto and this amount in the present invention is more than those contained generally in foods. In addition, in the present invention the amount of edible fiber contained in the Natto food can be easily increased by blending other edible fiber; and quite effects described above can be expected including diet.

Also, the edible fiber used in the present invention normally contains a slight sweetness, but has neither taste nor smell and hardly reacts with the nutrient elements contained in the Natto powder and the soybean flour used. Thus the edible fiber does not change the flavor of the Natto powder and the soybean flour. In addition, the one's fondness can be enhanced because of this slight sweetness. Because of no smell and no activity to other nutrient components of the edible fiber, the edible fiber can be utilized very conveniently for the natto food according to the present invention. Also, the edible fiber used in the present invention has the functions of shape-preserving ability for arranging the mold and of film formation during food processing, so that pelletizing, shaping and granulating can be made easier. In addition, the peculiar smell of natto can be absorbed and masked to a certain degree by the edible fiber.

EXAMPLES

Hereinafter, the present invention will be described in detail by some examples and comparative examples, but the present invention is not restricted by these examples as long as they are not deviated from the scope of the present invention.

EXAMPLE-1

300 g of natto (fermented soybean product) which has elapsed 3 days after the production was vacuum frozen and dried by ordinary method, all the grains of the dried natto was powdered with a crushing machine, and 120 g of natto powder was obtained. 20 g of soybean flour was added to 90 g of the natto powder in a ratio of 0.22 parts by weight of the soybean flour to 1 part by weight of the natto powder. As a binder aqueous solution, 200 cc of heated 2.5% corn scorch (edible fiber) aqueous solution was added thereto and uniformly mixed. The powder mixture was pelletized, shaped and finished to granules by using a fluid layer pelletizing machine (trade name: NQ-LABO, manufactured by Fuji Powdal Co., Inc.). Moreover, the granules were dried with hot air for about 40 minutes at 55 to 65° C. and 102 g of the natto food having no peculiar smell of natto (granules natto mixed with soybean flour) of the present invention was obtained.

The obtained natto food was evaluated for its characteristics by an inspection panel with 15 members with respect to shape, tint, peculiar smell (by smelling a very small amount of the natto food put on the hand), deliciousness, and stickiness to the touch as one's fondness by means of functional tests; in which they were evaluated by 5-point method in accordance with the evaluation criteria shown below and the results were shown on the Table 1.

EVALUATION CRITERIA

SHAPE
 5; Granules having neat, round shapes with uniform grains
 4; Granules with uniform grains
 3; Granules with almost uniform form
 2; State where granules and granular solids are mixed together
 1; Not granular TINT
 5; Yellowish color lighter than the powder of natto raw material
 4; Same color as the powder of natto raw material
 3; Color slightly darker than the powder of natto raw material
 2; Brown color considerably darker than the powder of natto raw material
 1; Blackish brown color PECULIAR SMELL
 5; There is no peculiar smell of natto.
 4; There is a slight peculiar smell of natto.
 3; There is some peculiar smell of natto.
 2; There is a peculiar smell irritating nose slightly.
 1; There is a peculiar smell irritating nose considerably.

DELICIOUSNESS
 5; There is deliciousness of natto.
 4; Deliciousness of natto is not sufficient.
 3; Deliciousness of natto is lacking considerably.
 2; There is no deliciousness of natto.
 1; There is no deliciousness of natto and there is another worse taste.

STICKINESS
 5; When eating, soft touch without stickiness
 4; When eating, not sticky to the teeth but slightly sticky to the deep throat
 3; When eating, there is a slight stickiness to the touch
 2; When eating, slightly sticky and sticks to the teeth
 1; When eating; sticky and sticks to the teeth

EXAMPLE-2

10 g of soybean flour and 10 g of edible fiber (dextrin containing edible fiber stated previously) were used instead of using 20 g of soybean flour in the EXAMPLE-1, otherwise, the conditions were the same as those of the EXAMPLE-1; and the evaluation was made for the granules in the same manner as EXAMPLE-1 on the shape, tint, peculiar smell, deliciousness and stickiness, and the results are shown in Table 1.

EXAMPLE-3

Edible fiber (dextrin containing edible fiber stated previously) was added in a ratio of 0.22 parts by weight of the edible fiber to 1 part of the natto powder obtained in the EXAMPLE-1; and the granules were prepared by the same manner as in the EXAMPLE-1. The evaluation was made for the granules in the same manner as EXAMPLE-1 on the shape, tint, peculiar smell, deliciousness and stickiness, and the results are shown in Table 1.

COMPARATIVE EXAMPLE-1

With respect to the 100% of the powder of the natto raw material obtained in EXAMPLE-1 processed in the same manner of the EXAMPLE-1, the evaluation was made by the same manner as EXAMPLE-1 on the shape, tint, peculiar smell, deliciousness and stickiness, and the results are shown in Table 1.

Table 1
Results of the Evaluation of Fondness and Characteristics by Functional Tests

| Properties | Shape | Tint | Peculiar Smell Of Natto | Delicious-ness | Sticki-ness | Average |
|---|---|---|---|---|---|---|
| EXAMPLE-1 | 5 | 3.9 | 5 | 3.7 | 5 | 4.5 |
| EXAMPLE-2 | 4.5 | 4.5 | 3.5 | 3.2 | 4.5 | 4.0 |
| EXAMPLE-3 | 4.2 | 5 | 3.1 | 1.9 | 3.8 | 3.6 |
| COMPARATIVE EXAMPLE-1 | 1.2 | 2.3 | 2.3 | 3.1 | 2.1 | 2.2 |

As clearly shown in Table 1, it can be understood that the natto food of the EXAMPLE-1 according to the present invention, which was made to granules after blending the soybean flour and the edible fiber with the natto powder, has excellent granules with beautiful, round forms, with a good color almost as same as the powder of the natto raw material without the peculiar smell of the natto; has good deliciousness though the delicious taste of natto is slightly lacking; has no stickiness and is gentle to the touch when eating; and the average value of the above is high in overall evaluation.

The natto food of the EXAMPLE-2 according to the present invention, which was made to granules by blending natto powder, soybean flour together with more amount of edible fiber, has excellent granules with beautiful forms and uniform grains, has a good color brighter than the powder of natto raw material with a slight peculiar smell of natto with the deliciousness slightly inferior to that of the natto; this sample is not sticky to the teeth and slightly sticky only to a deep throat portion when eating; it can be understood that the average value of the above can be fairly well in the overall evaluation.

The natto food of the EXAMPLE-3 according to the present invention, which was made to granules by blending the natto powder further with the edible fiber, provides the granules with uniform grains, a good color brighter than the powder of natto raw material and a slight peculiar smell of natto. But the sample had no deliciousness of natto and was sticky to a deep portion of the throat though it was not sticky to the teeth. In the overall evaluation, this sample was positioned next to the EXAMPLE-1 and EXAMPLE-2.

On the other hand, 100% of powder of the natto raw material in the comparative example-1 was not granules, the color was considerably blackish brown compared to the powder of natto raw material, had a stronger peculiar smell slightly irritating the nose, had a less deliciousness of the natto, and was slightly sticky and stuck to the teeth when eating. In the overall evaluation, the comparative examples-1 was the worst compared to the EXAMPLES-1 to -3.

EXAMPLE-4

The natto food according to the present invention was obtained by the same manner as that of EXAMPLE-1 except that no corn starch (edible fiber) was used. The shape, tint, peculiar smell, deliciousness and stickiness were evaluated in the same manner as the EXAMPLE 1 and excellent results almost the same as the EXAMPLE-1 were obtained.

EXAMPLE-5

With respect to the natto food of present invention prepared by the same manner as the EXAMPLE-1 except that the ratio of the soybean flour to 1 part by weight of the natto powder was 0.10 parts by weight, and also with respect the natto food of present invention prepared in the same manner as the EXAMPLE-1 except that the ratio of the soybean flour to 1 part by weight of the natto powder was 0.01 parts by weight, the evaluations were made in the same manner as EXAMPLE-1. The shape thereof became granular in each case though there was a slight peculiar smell of natto, but the tint and deliciousness were excellent and stickiness was slightly felt when eating.

EXAMPLE-6

With respect to the natto food of present invention prepared by the same manner as the EXAMPLE-1 except that the ratio of the soybean flour to 1 part by weight of the natto powder was 0.40 part by weight, and also with respect the natto food of present invention prepared by the same manner as the EXAMPLE-1 except that the ratio of the soybean flour to 1 part by weight of the natto powder was 1 part by weight, the evaluations thereof were made in the same manner as EXAMPLE-1. In each case, there was a flavor of soybean flour but excellent results were obtained for the shape, tint, peculiar smell and stickiness.

EXAMPLE-7

With respect to the natto food of present invention prepared by the same manner as the EXAMPLE-1 except that the ratio of the natto powder to 1 part by weight of the soybean flour was 0.1 parts by weight, and also with respect the natto food of present invention prepared by the same manner as the EXAMPLE-1 except that the ratio of the natto powder to 1 part by weight of the soybean flour was 0.01 parts by weight, the evaluations thereof were made in the same manner as EXAMPLE-1. In each case, there was a flavor of soybean flour but excellent results were obtained for the shape, tint, peculiar smell and stickiness.

EXAMPLE-8

With respect to the natto food of present invention prepared by the same manner as the EXAMPLE-1 except that the ratio of the natto powder to 1 part by weight of the soybean flour was 0.4 parts by weight, the evaluation was made in the same manner as EXAMPLE-1, there was a flavor of soybean flour but excellent results were obtained for the shape, tint, peculiar smell and stickiness.

EXAMPLE-9

A powder mixture blended in a ratio of 0.22 parts by weight of the soybean flour to 1 part by weight of the natto powder was used as the natto food of the present invention without pelletizing and drying.

Evaluation was made in the same manner as the EXAMPLE-1 for the tint, peculiar smell, deliciousness and stickiness of the natto food of the present invention; and, as a result, deliciousness was slightly low but there were new flavor and deliciousness slightly, stickiness was slightly felt, but the tint was almost the same as that of the natto raw material and no peculiar smell was felt.

According to the present invention, without giving special heat-treatment to the powder mixture blended soybean and/or edible fiber with natto powder, the natto food can be made as it is depending upon the purpose of use. The resulted natto food of present invention has less peculiar smell of the natto, has a good tint as well as slight amounts of new flavor and deliciousness.

According to the present invention, the soybean flour and/or edible fiber are mixed to the natto powder, and the mixture is pelletized, shaped and dried with heat-treatment, by which the stickiness of the natto is considerably reduced, bonding of the powder is improved and uniform granules are finished, moreover, new flavor and deliciousness can be given, so that the range of use and application can be enlarged, the efficiency in use and processing can be enhanced and also the costs can be reduced. In addition, the peculiar smell of natto can be removed, the color can be improved, the powder can be handled with less scattering and excellent dispersibility during use, while providing good feeling when eating without sticking to the oral cavity and providing new flavor and deliciousness.

The natto food according to the present invention improves the dispersibility when using by mixing with other foods and does not create granular solids even though cold water or warm water is added.

The natto according to the present invention has created extremely good general-purpose usage as a raw material for processed foods utilizing the high nutrition possessed by the natto, which cannot be seen in other foods, because the conventional peculiar smell of the Natto as one of the factors limiting the use and scope when processing and using the natto can be absorbed, masked and eliminated by the soybean flour and/or edible fiber having porous texture.

The natto used in the present invention contains a large amount of rough fiber compared to other foods in general, so that many effects including diet as explained previously.

If the natto food of present invention is mixed with mayonnaise, seasoned eggs of pollack, noodles such as wheat vermicelli or dressing for example, no granular solids are created, granules can be dispersed neatly and easily, no peculiar smell of the natto is felt, deliciousness is taken out when eating thereby amplifying the flavor.

Moreover, the natto food of present invention, if eaten as it is, gives gentle feeling without smell and can be easily eaten; and it can be eaten easily any time anywhere other than the mealtime if carried in small packs.

What is claimed is:

1. A natto food having diminished natto odor, comprising natto powder and a member selected from the group consisting of soybean flour, edible fiber, and a combination of soybean flour and edible fiber, in a ratio of about 0.15 to 0.3 parts by weight of the member to about 1 part by weight of the natto powder, said natto food being prepared by a process comprising the steps of blending the natto powder with the member, pelletizing and shaping the blended natto powder mixture into granules, and drying the granules, in which a heat treatment step is carried out during at least one of the steps.

2. A natto food according to claim 1, wherein the natto food has been heat-treated for about 30–40 minutes at about 50–65° C.

3. A natto food according to claim 1, wherein the natto food has been shaped into granules, by adding to the natto powder mixture, a small amount of an aqueous solution comprising about 1–3 wt % of a binder.

4. A natto food according to claim 3, wherein said binder is a starch.

5. A natto food according to claim 1, wherein said member is said edible fiber or said combination of soybean flour and edible fiber, and said edible fiber comprises a polysaccharide.

6. A natto food according to claim 1, further comprising additional food material selected from the group consisting of: tea, a fruit, sea weed, beefsteak plant, coffee, cocoa powder, a dairy product; a seasoning; and a sweetener.

7. A natto food according to claim 6, wherein said additional food material is fruit and said fruit is apple, orange, tomato, or Japanese apricot.

8. A natto food according to claim 6, wherein said additional food material is a dairy product and said dairy product is cheese.

9. A natto food according to claim 6, wherein said additional food material is said seasoning and said seasoning is glycine.

10. A natto food according to claim 6, wherein said additional food material is said sweetener and said sweetener is sugar, maple syrup, muscovado, or watermelon sugar.

* * * * *

UNITED STATES PATENT AND TRADEMARK OFFICE
CERTIFICATE OF CORRECTION

PATENT NO.    : 6,022,580
DATED         : February 8, 2000
INVENTOR(S)   : Shinichiro Akatsuka It is certified that error appears in the above-identified patent and that said Letters Patent is hereby corrected as shown below:

Column 6,
Line 11, after "the" insert -- enzymatic reaction of the protein possessed by natto, thereby --; and Column 7,
Line 21, "scorch" should read -- starch --.

Signed and Sealed this

Sixteenth Day of July, 2002

Attest:

JAMES E. ROGAN
Attesting Officer        Director of the United States Patent and Trademark Office